United States Patent
Wu

(10) Patent No.: US 10,548,176 B2
(45) Date of Patent: Jan. 28, 2020

(54) DEVICE AND METHOD OF HANDLING DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 65 days.

(21) Appl. No.: 15/885,756

(22) Filed: Jan. 31, 2018

(65) Prior Publication Data

US 2018/0220484 A1    Aug. 2, 2018

Related U.S. Application Data

(60) Provisional application No. 62/453,991, filed on Feb. 2, 2017, provisional application No. 62/468,927, filed on Mar. 8, 2017.

(51) Int. Cl.
*H04W 72/04* (2009.01)
*H04W 76/02* (2009.01)
*H04W 76/15* (2018.01)
*H04W 76/19* (2018.01)

(52) U.S. Cl.
CPC .......... *H04W 76/15* (2018.02); *H04W 72/04* (2013.01); *H04W 76/19* (2018.02)

(58) Field of Classification Search
None
See application file for complete search history.

(56) References Cited

U.S. PATENT DOCUMENTS

| 2014/0051447 A1* | 2/2014 | Li | H04W 36/0055 455/437 |
| 2014/0313877 A1* | 10/2014 | Gao | H04W 24/04 370/216 |
| 2015/0119048 A1* | 4/2015 | Yang | H04W 16/32 455/444 |

(Continued)

FOREIGN PATENT DOCUMENTS

| EP | 3048854 A1 | 7/2016 |
| EP | 3094133 A1 | 11/2016 |

(Continued)

OTHER PUBLICATIONS

Search Report dated Jun. 14, 2018 for EP application No. 18154802.5, pp. 1-4.

(Continued)

*Primary Examiner* — Duc T Duong
(74) *Attorney, Agent, or Firm* — Winston Hsu

(57) ABSTRACT

A communication device of handling dual connectivity comprises instructions of establishing a radio resource control (RRC) connection to a master base station (MBS) via at least one first carrier frequency; receiving a first RRC reconfiguration message from the MBS via the RRC connection, wherein the first RRC reconfiguration message configures the communication device to connect to a secondary base station (SBS) via at least one second carrier frequency; determining a first reconfiguration failure according to a first configuration for communicating with the SBS in the first RRC reconfiguration message; and transmitting a RRC notification message to the MBS via the RRC connection to indicate the first reconfiguration failure, in response to the first reconfiguration failure.

11 Claims, 4 Drawing Sheets

(56) References Cited

U.S. PATENT DOCUMENTS

| | | | |
|---|---|---|---|
| 2015/0215826 A1 | 7/2015 | Yamada | |
| 2016/0057800 A1* | 2/2016 | Ingale | H04W 56/0005 370/216 |
| 2016/0095004 A1 | 3/2016 | Tseng | |
| 2016/0285716 A1* | 9/2016 | Pelletier | H04L 5/0098 |
| 2016/0316508 A1* | 10/2016 | Hong | H04W 28/08 |
| 2017/0318504 A1* | 11/2017 | Zhang | H04W 36/0055 |
| 2018/0049214 A1* | 2/2018 | Kubota | H04W 36/0055 |
| 2019/0082366 A1* | 3/2019 | Miao | H04W 76/10 |
| 2019/0327028 A1* | 10/2019 | Yi | H04L 1/1896 |

FOREIGN PATENT DOCUMENTS

| | | |
|---|---|---|
| WO | 2014/111027 A1 | 7/2014 |
| WO | 2015/066385 A2 | 5/2015 |
| WO | 2015/066385 A3 | 5/2015 |

OTHER PUBLICATIONS

Office action dated Sep. 18, 2018 for the Taiwan application No. 107103605, filing date Feb. 1, 2018, pp. 1-10.
3GPP TS 36.331 V14.1.0, Dec. 2016.

\* cited by examiner

DEVICE AND METHOD OF HANDLING DUAL CONNECTIVITY

CROSS REFERENCE TO RELATED APPLICATIONS

This application claims the benefit of U.S. Provisional Applications No. 62/453,991, filed on Feb. 2, 2017, and No. 62/468,927, filed on Mar. 8, 2017, which are incorporated herein by reference.

BACKGROUND OF THE INVENTION

1. Field of the Invention

The present invention relates to a device and a method used in a wireless communication system, and more particularly, to a device and a method of handling dual connectivity.

2. Description of the Prior Art

A user equipment (UE) may simultaneously communicate with a master base station (MBS) and a secondary base station (SBS), to realize dual connectivity. However, it is unknown how to communicate with the MBS and the SBS operated in the dual connectivity, when the UE detects a radio resource control (RRC) reconfiguration failure. Thus, how to handle the dual connectivity considering the RRC configuration failure is an important problem to be solved.

SUMMARY OF THE INVENTION

The present invention therefore provides a communication device and method for handling dual connectivity to solve the abovementioned problem.

A communication device of handling dual connectivity comprises a storage device; and a processing circuit, coupled to the storage device, wherein the storage device stores, and the processing circuit is configured to execute instructions of: establishing a radio resource control (RRC) connection to a master base station (MBS) via at least one first carrier frequency; receiving a first RRC reconfiguration message from the MBS via the RRC connection, wherein the first RRC reconfiguration message configures the communication device to connect to a secondary base station (SBS) via at least one second carrier frequency; determining a first reconfiguration failure according to a first configuration for communicating with the SBS in the first RRC reconfiguration message; and transmitting a RRC notification message to the MBS via the RRC connection to indicate the first reconfiguration failure, in response to the first reconfiguration failure.

A communication device of handling dual connectivity comprises a storage device; and a processing circuit, coupled to the storage device, wherein the storage device stores, and the processing circuit is configured to execute instructions of: comprise connecting to a master base station (MBS) of via at least one first carrier frequency, and connecting to a secondary base station (SBS) via at least one second carrier frequency; receiving a first radio resource control (RRC) reconfiguration message from the SBS when connecting to the MBS and the SBS, wherein the first RRC reconfiguration message configures a first configuration for communicating with the SBS; determining a first reconfiguration failure according to the first configuration; and transmitting a RRC notification message to the MBS via a RRC connection to indicate the first reconfiguration failure, in response to the first reconfiguration failure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
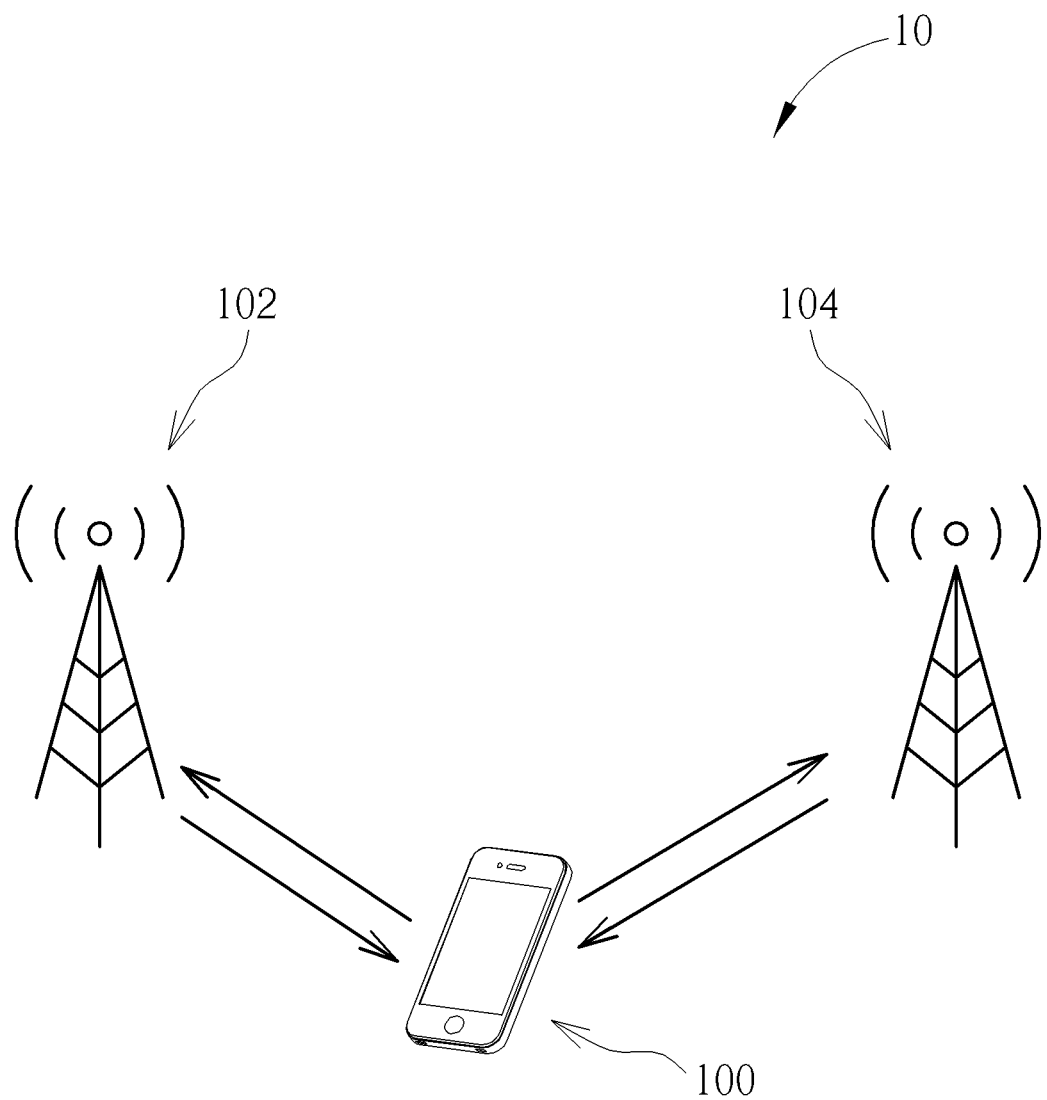
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, base station (BSs) 102 and 104. In FIG. 1, the communication device 100, the BS 102s and 104 are simply utilized for illustrating the structure of the wireless communication system 10. Practically, each of the BSs 102 and 104 may be an evolved Node-B (eNB) which may connect to an evolved packet core (EPC), may be a fifth generation (5G) (or called new radio (NR)) BS (or called gNB) which may connect to a Next Generation (NG) Core (NGC), or may be an enhanced Long Term Evolution (LTE) (eLTE) eNB which may connect to the NGC. In the following description, a BS refers any of the eNB, the 5G BS and the eLTE eNB.

As shown in FIG. 1, the communication device 100 may be configured to communicate with the BSs 102 and 104 simultaneously according to dual connectivity. That is, the communication device 100 may perform a transmission/reception via both the BSs 102 and 104. For example, the communication device 100 may transmit and/or receive packets (e.g., protocol data units (PDUs)) to and/or from the BS 102 via at least one cell of the BS 102, while the communication device 100 may transmit and/or receive packets (e.g., PDUs) to and/or from the BS 104 via at least one cell of the BS 104. In addition, one of the BSs 102 and 104 may be a master BS (MBS) and the other BS may be a secondary BS (SBS).

Technical terms related to the examples in the present invention are explained as follows to simplify description of successive examples. A communication device in RRC_CONNECTED may be configured with a master cell group (MCG) for communicating with the MBS and a secondary cell group (SCG) for communicating with the SBS. A MBS may be a master eNB (MeNB) or a master gNB (MgNB). A SBS may be a secondary eNB (SeNB) or a secondary gNB (SgNB). A MCG may include a primary cell (Pcell) and secondary cell(s) (SCell(s)) of the MBS if the SCell(s) is configured to the communication device. A SCG may include a primary SCell (PSCell) and the SCell(s) of the SBS if the SCell(s) is configured to the communication device. A MCG bearer may be a radio bearer whose radio protocols are only located in a MBS to use MBS resources only. A SCG bearer may be a radio bearer whose radio protocols are only located in a SBS to use SBS resources. A split bearer may be a bearer whose radio protocols are located in both the MBS and the SBS to use both MBS and SBS resources.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
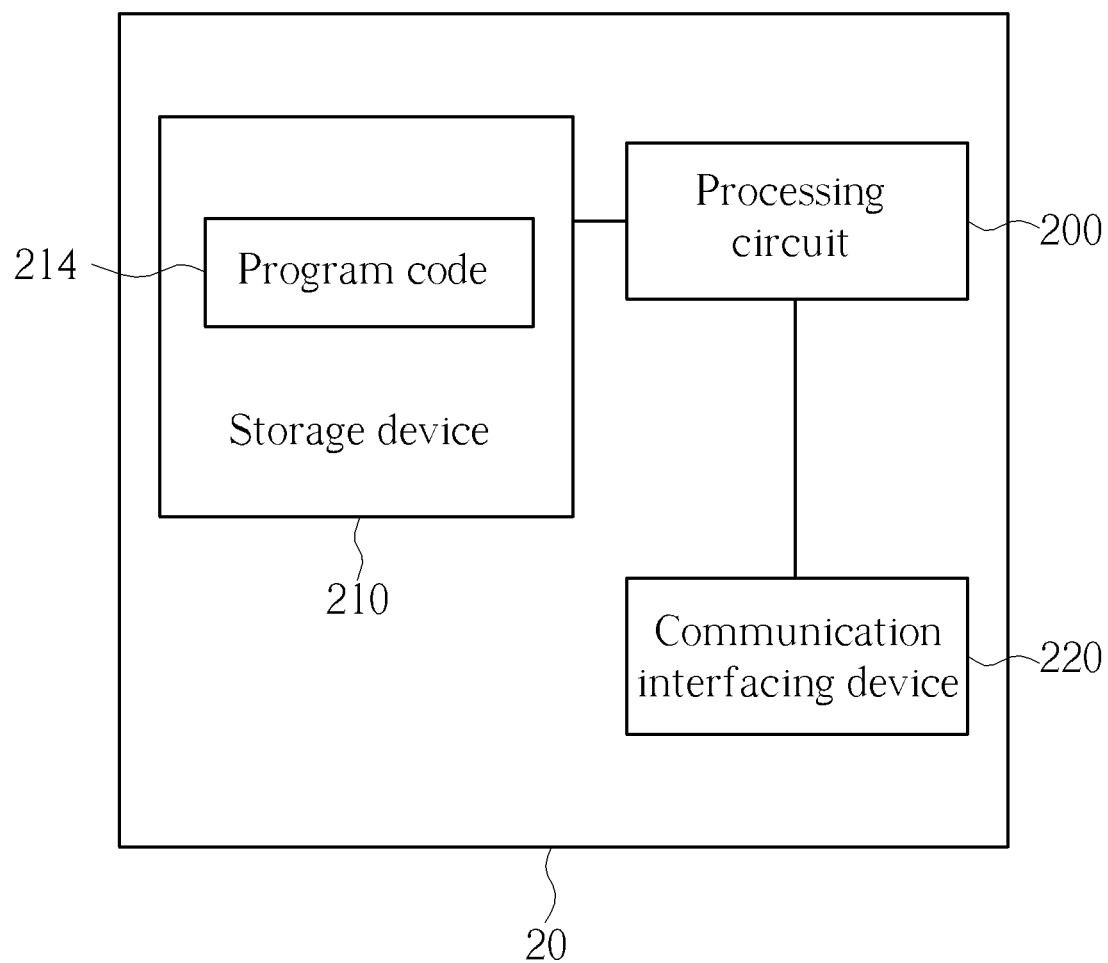
FIG. 2 is a schematic diagram of a communication device according to an example of the present invention.

FIG. 2 is a schematic diagram of a communication device 20 according to an example of the present invention. The communication device 20 may be the communication device 100, the BS 102 or 104 shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver used to transmit and receive signals (e.g., data, messages and/or packets) according to processing results of the processing circuit 200. The BS may belong to (e.g., is managed/controlled by) the network to perform steps or instructions for realizing the following examples.

In the following examples, a UE is used for representing the communication device in FIG. 1, to simplify the illustration of the examples.

Figure 3:
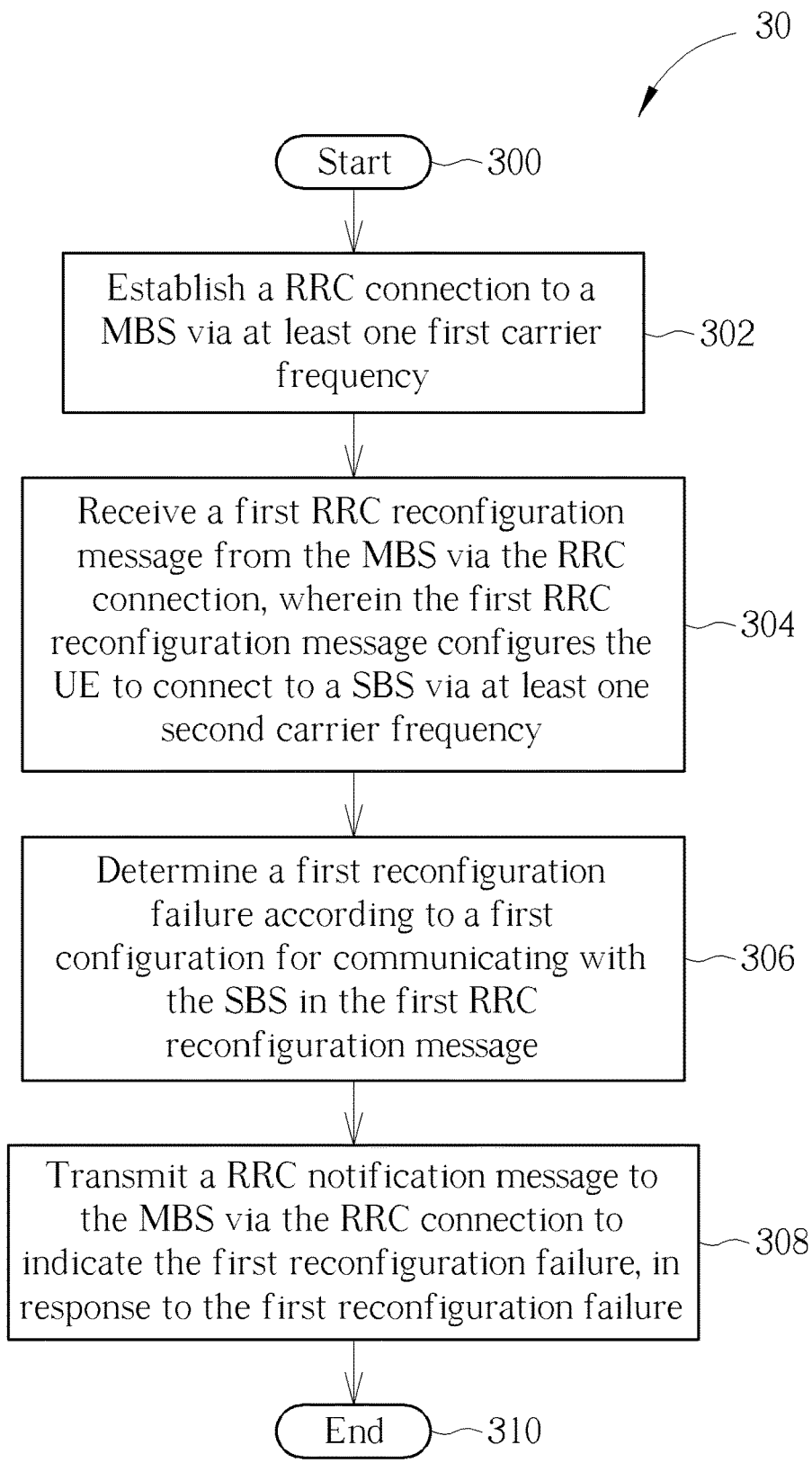
FIG. 3 is a flowchart of a process according to an example of the present invention.

FIG. 3 is a flowchart of a process 30 according to an example of the present invention. The process 30 may be utilized in a UE and includes the following steps:

Step 300: Start.

Step 302: Establish a radio resource control (RRC) connection to a MBS via at least one first carrier frequency.

Step 304: Receive a first RRC reconfiguration message from the MBS via the RRC connection, wherein the first RRC reconfiguration message configures the UE to connect to a SBS via at least one second carrier frequency.

Step 306: Determine a first reconfiguration failure according to a first configuration for communicating with the SBS in the first RRC reconfiguration message.

Step 308: Transmit a RRC notification message to the MBS via the RRC connection to indicate the first reconfiguration failure, in response to the first reconfiguration failure.

Step 310: End.

Realization of the processes 30 is not limited to the above description. The following examples may be applied to the processes 30.

In one example, the UE receives a second configuration in the first RRC reconfiguration message or in a second RRC reconfiguration message from the MBS via the RRC connection, wherein the second configuration configures (or reconfigures) a parameter used by the UE to communicate with the MBS. The UE determines a second reconfiguration failure according to the second configuration, i.e., the second configuration is invalid. Then, the UE performs a RRC connection reestablishment procedure with the MBS in response to the second reconfiguration failure.

In one example, the UE establishes the RRC connection to the MBS via the at least one first carrier frequency. The UE receives a third RRC reconfiguration message from the MBS via the RRC connection, wherein the third RRC reconfiguration message configures the UE to connect to a SBS via at least one third carrier frequency. The UE determines a third reconfiguration failure according to a third configuration for communicating with the SBS in the third RRC reconfiguration message, i.e., the third configuration is invalid. Then, the UE performs a RRC connection reestablishment procedure with the MBS in response to the third reconfiguration failure.

Figure 4:
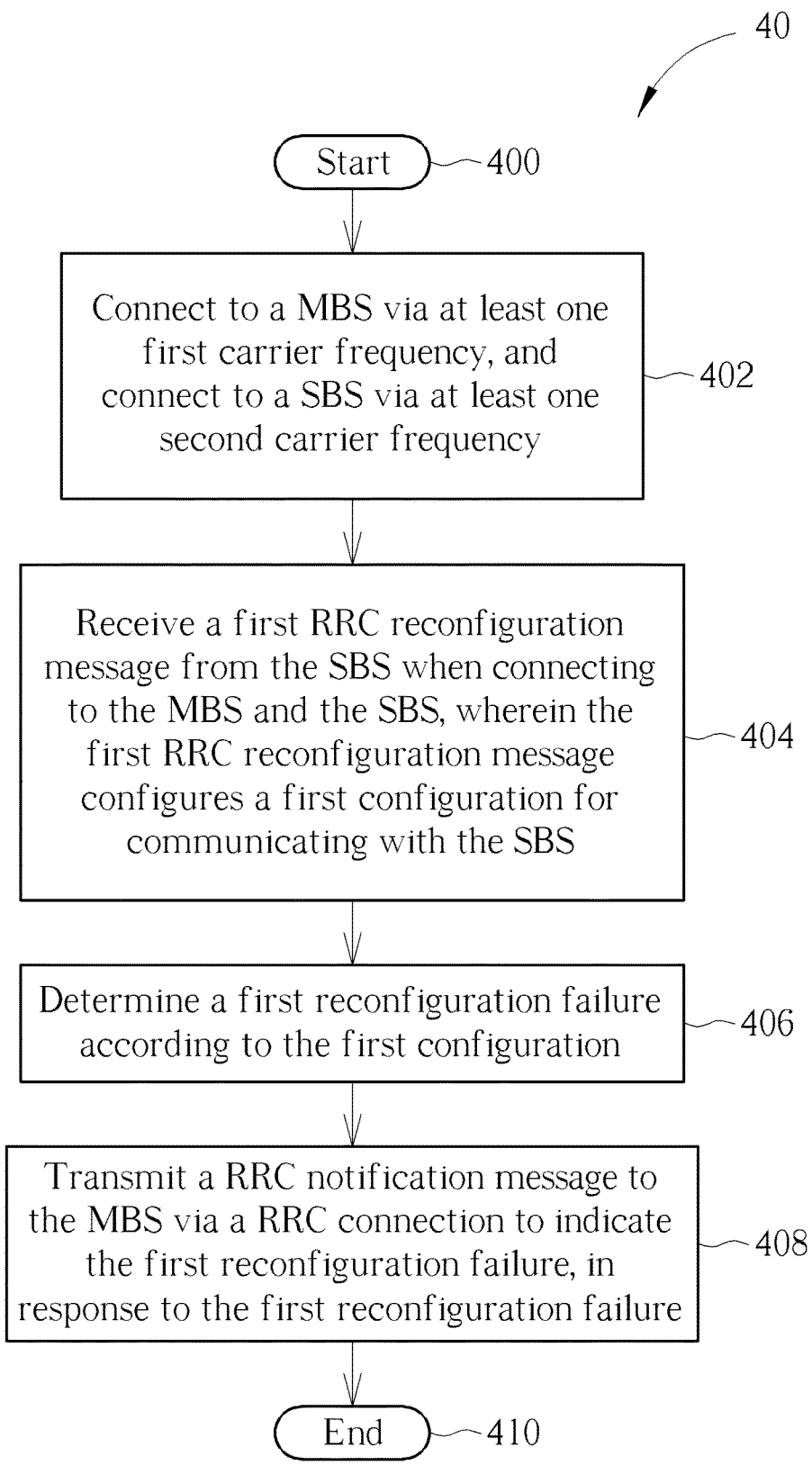
FIG. 4 is a flowchart of a process according to an example of the present invention.

FIG. 4 is a flowchart of a process 40 according to an example of the present invention. The process 40 may be utilized in a UE and includes the following steps:

Step 400: Start.

Step 402: Connect to a MBS via at least one first carrier frequency, and connect to a SBS via at least one second carrier frequency.

Step 404: Receive a first RRC reconfiguration message from the SBS when connecting to the MBS and the SBS, wherein the first RRC reconfiguration message configures a first configuration for communicating with the SBS.

Step 406: Determine a first reconfiguration failure according to the first configuration.

Step 408: Transmit a RRC notification message to the MBS via a RRC connection to indicate the first reconfiguration failure, in response to the first reconfiguration failure.

Step 410: End.

The UE may establish a RRC connection with the MBS and may establish a signaling radio bearer (SRB) with the SBS. The SBS may transmit the first RRC reconfiguration message to the UE via the MBS. The UE may receive the first RRC reconfiguration message from the MBS via the RRC connection. Alternatively, the SBS may transmit the first RRC reconfiguration message to the UE via the SRB (i.e., without via the MBS). The UE may receive the first RRC reconfiguration message from the SBS via the SRB.

Realization of the processes 40 is not limited to the above description. The following examples may be applied to the processes 40.

In one example, the UE receives a second configuration in the first RRC reconfiguration message or in a second RRC reconfiguration message from the MBS via the RRC connection, wherein the second configuration configures a parameter used by the UE to communicate with the MBS. The UE determines a second reconfiguration failure according to the second configuration. Then, the UE performs a RRC connection reestablishment procedure with the MBS in response to the second reconfiguration failure.

In one example, the UE stops communicating with the SBS or stopping connecting to the SBS in response to the first or second reconfiguration failure. That is, the UE does not transmit/receive data to/from the SBS.

In one example, the UE connects to the MBS via the at least one first carrier frequency, and connects to a SBS via at least one third carrier frequency, i.e., the UE is in dual connectivity. The UE receives a third RRC reconfiguration message from the MBS via the RRC connection when connecting to the MBS and the SBS, wherein the third RRC reconfiguration message configures a third configuration for communicating with the SBS. The UE determines a third reconfiguration failure according to the third configuration, i.e., the third configuration is invalid. Then, the UE performs a RRC connection reestablishment procedure with the MBS in response to the third reconfiguration failure.

Realizations of the processes 30-40 are not limited to the above description. The following examples may be applied to the processes 30-40.

The UE may not (e.g., determines not to) trigger a RRC connection reestablishment procedure and may suspend data transmission, in response to the first reconfiguration failure.

In one example, the UE may receive the first reconfiguration message including the first configuration, from the SBS directly instead of via the RRC connection.

In one example, the RRC notification message includes information describing the first reconfiguration failure. In one example, the information indicates that the first reconfiguration failure occurs, when (e.g., due to) the first configuration is not supported by (e.g., over) a UE capability of the UE. In one example, the information indicates that the first reconfiguration failure occurs, when (e.g., due to) the UE does not comply with the first configuration. When the MBS receives the RRC notification message, the MBS may transmit the information to the SBS such that the SBS may determine (e.g., derive) why the first configuration is determined as invalid or may determine (e.g., guess) which configuration is determined by the UE as invalid.

The MBS may be a BS of a first radio access technology (RAT) and the second BS may be a BS of a second RAT. The first RAT and the second RAT may be the same or different. In one example, the first RAT include (or is) a LTE or an eLTE, and the second RAT includes (or is) a NR. In one example, the first RAT includes (or is) a NR, and the second RAT includes (or is) a LTE or an eLTE.

In one example, the first/second/third RRC reconfiguration message include (or is) a RRCConnectionReconfiguration message. In one example, the first/second/third RRC reconfiguration message is included in a RRCConnectionReconfiguration message. In one example, the RRC notification message includes (or is) a SCGFailureInformation message. The RRC connection may include a SRB. The UE may transmit the SCGFailureInformation message to the MBS via the SRB.

In the RRC connection reestablishment procedure, the UE may transmit a RRCConnectionReestablishmentRequest message to the MBS. The MBS may transmit a RRCConnectionReestablishment message to the UE in response to the RRCConnectionReestablishmentRequest message.

The first and second configurations may be the same or different. In case they are the same, the UE determines to perform the RRC connection reestablishment procedure or transmits the RRC notification message according to whether the UE receives the first (or second) configuration from the MBS or SBS.

The UE may perform the RRC connection reestablishment procedure according to (e.g., by) detecting a radio link failure with the MBS. The UE may transmit the RRC notification message to the MBS according to (e.g., by) detecting a radio link failure with the SBS.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and related communication device for handling dual connectivity. Thus, the UE knows how to communicate with the MBS and the SBS operated in the dual connectivity, when the UE detects the RRC reconfiguration failure. As a result, the problem of the dual connectivity is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling dual connectivity, comprising:
    a storage device; and
    a processing circuit, coupled to the storage device, wherein the storage device stores instructions, and the processing circuit is configured to execute the instructions of:
        establishing a radio resource control (RRC) connection to a master base station (MBS) via at least one first carrier frequency;
        receiving a first RRC reconfiguration message from the MBS via the RRC connection, wherein the first RRC reconfiguration message configures the communication device to connect to a secondary base station (SBS) via at least one second carrier frequency;
        determining a first reconfiguration failure according to a first configuration for communicating with the SBS in the first RRC reconfiguration message;
        transmitting a RRC notification message to the MBS via the RRC connection to indicate the first reconfiguration failure, in response to the first reconfiguration failure;
        receiving a second configuration in the first RRC reconfiguration message or in a second RRC reconfiguration message from the MBS via the RRC connection, wherein the second configuration configures a parameter used by the communication device to communicate with the MBS;
        determining a second reconfiguration failure according to the second configuration; and
        performing a RRC connection reestablishment procedure with the MBS in response to the second reconfiguration failure.

2. The communication device of claim 1, wherein the RRC notification message comprises information describing the first reconfiguration failure.

3. The communication device of claim 1, wherein the RRC notification message comprises a SCGFailureInformation message.

4. A communication device of handling dual connectivity, comprising:
    a storage device; and
    a processing circuit, coupled to the storage device, wherein the storage device stores instructions, and the processing circuit is configured to execute the instructions of:

connecting to a master base station (MBS) via at least one first carrier frequency, and connecting to a secondary base station (SBS) via at least one second carrier frequency;

receiving a first radio resource control (RRC) reconfiguration message from the SBS when connecting to the MBS and the SBS, wherein the first RRC reconfiguration message configures a first configuration for communicating with the SBS;

determining a first reconfiguration failure according to the first configuration;

transmitting a RRC notification message to the MBS via a RRC connection to indicate the first reconfiguration failure, in response to the first reconfiguration failure;

receiving a second configuration in the first RRC reconfiguration message or in a second RRC reconfiguration message from the MBS via the RRC connection, wherein the second configuration configures a parameter used by the communication device to communicate with the MBS;

determining a second reconfiguration failure according to the second configuration; and performing a RRC connection reestablishment procedure with the MBS in response to the second reconfiguration failure.

5. The communication device of claim 4, wherein the instructions further comprise:

stopping communicating with the SBS or stopping connecting to the SBS in response to the first reconfiguration failure.

6. The communication device of claim 4, wherein the instructions further comprise:

connecting to the MBS via the at least one first carrier frequency, and connecting to a SBS via at least one third carrier frequency;

receiving a third RRC reconfiguration message from the MBS via the RRC connection when connecting to the MBS and the SBS, wherein the third RRC reconfiguration message configures a third configuration for communicating with the SBS;

determining a third reconfiguration failure according to the third configuration; and performing a RRC connection reestablishment procedure with the MBS in response to the third reconfiguration failure.

7. The communication device of claim 4, wherein the RRC notification message comprises information for describing the first reconfiguration failure.

8. A method of handling dual connectivity for a communication device, the method comprising:

connecting to a master base station (MBS) via at least one first carrier frequency, and connecting to a secondary base station (SBS) via at least one second carrier frequency;

receiving a first radio resource control (RRC) reconfiguration message from the SBS when connecting to the MBS and the SBS, wherein the first RRC reconfiguration message configures a first configuration for communicating with the SBS;

determining a first reconfiguration failure according to the first configuration;

transmitting a RRC notification message to the MBS via a RRC connection to indicate the first reconfiguration failure, in response to the first reconfiguration failure;

receiving a second configuration in the first RRC reconfiguration message or in a second RRC reconfiguration message from the MBS via the RRC connection, wherein the second configuration configures a parameter used by the communication device to communicate with the MBS;

determining a second reconfiguration failure according to the second configuration; and performing a RRC connection reestablishment procedure with the MBS in response to the second reconfiguration failure.

9. The method of claim 8, further comprising:

stopping communicating with the SBS or stopping connecting to the SBS in response to the first reconfiguration failure.

10. The method of claim 8, further comprising:

connecting to the MBS via the at least one first carrier frequency, and connecting to a SBS via at least one third carrier frequency;

receiving a third RRC reconfiguration message from the MBS via the RRC connection when connecting to the MBS and the SBS, wherein the third RRC reconfiguration message configures a third configuration for communicating with the SBS;

determining a third reconfiguration failure according to the third configuration; and performing a RRC connection reestablishment procedure with the MBS in response to the third reconfiguration failure.

11. The method of claim 8, wherein the RRC notification message comprises information for describing the first reconfiguration failure.

* * * * *